May 7, 1968 H. P. SCHLAEPPI 3,382,386

MAGNETIC GEARS

Filed Dec. 23, 1964 5 Sheets-Sheet 1

INVENTOR.
HANS P. SCHLAEPPI
BY Stephen J. Limanek
ATTORNEY

1

3,382,386
MAGNETIC GEARS

Hans P. Schlaeppi, Thalwil, Zurich, Switzerland, assignor to International Business Machines Corporation, New York, N.Y., a corporation of New York Filed Dec. 23, 1964, Ser. No. 420,505
Claims priority, application Switzerland, Dec. 31, 1963, 16,083/63
14 Claims. (Cl. 310—104)

ABSTRACT OF THE DISCLOSURE

A magnetic gear consisting of magnetic coupling elements and of driving and driven components which are at a selected distance from each other, the whole being accommodated in a casing such that the magnetic flux through the aforesaid elements and components is closed. In operation, the change in magnetic resistance owing to the change of position of the driving and driven components in relation to the coupling elements generates the coupling forces, the ratio of the number of magnetizable areas in the driven component to the number of such areas in the driving component determining the gear ratio.

The invention relates to improved magnetic gears and more particularly to gears which have optimum properties in a wide range of applications.

In known gears, the gear components necessary for transmission of force are connected with one another mechanically and/or hydraulically. These gears exist for the most varied possible uses, with different conditions of operation; for example, gears with variable or fixed gear-up or gear-down ratios, with reversible direction of power transmission or self-locking in the direction opposite to that of power transmission, i.e., self-locking gears. With the many possible uses and operating conditions, known gears have optimum properties only for solving certain problems, i.e., in special applications some favorable properties may be partly sacrificed in order to solve the main problem satisfactorily. For example, with known self-locking gears the efficiency is lower than 50%, only in order to guarantee self-locking in the direction opposite to that of power transmission.

There is a need for producing a gear exhibiting optimum properties over a very wide range of applications under different operating conditions. The production costs of such a universally useable gear should be kept low. Maintenance and care must be reduced to a minimum. Of particular importance is the simple change of gear ratio.

If one uses a magnetic gear, one achieves an economical synthesis of all requirements. Costs are low, since no extreme tolerances are required for the individual gear components. Also, this gear is simple in design, e.g., coaxial construction. The individual gear components are not subject to wear, since no parts interact mechanically; instead, they are connected by a magnetic flux so as to transmit power. The gear is thus substantially free of mechanical friction. The desired gear ratio can be switched on and changed electrically. A further advantage is that, although the gear can be used as a self-locking mechanism, an efficiency of nearly 100% is achieved owing to the practically friction-free action.

Because of minimal care and maintenance, e.g., no lubricating of parts, the number of possbile applications is further increased, particularly for instruments, electric counters, calculating gears.

2

The invention is characterized by the fact that the gear consists of magnetic coupling elements and of driving and driven means or parts, which are at a certain distance from one another, the whole being so accommodated in a casing that the magnetic flux through the elements and parts is closed.

The method for operating the friction-free gear is characterized by the fact that the change in magnetic resistance owing to change of position of the driving and driven parts in relation to the coupling elements generates the coupling forces, the ratio of the number of magnetizable areas in the driven part to the number of such areas in the driving part determining the gear ratio.

The foregoing and other objects, features and advantages of the invention will be apparent from the following more particular description of preferred embodiments of the invention, as illustrated in the accompanying drawings.

Figure 1:
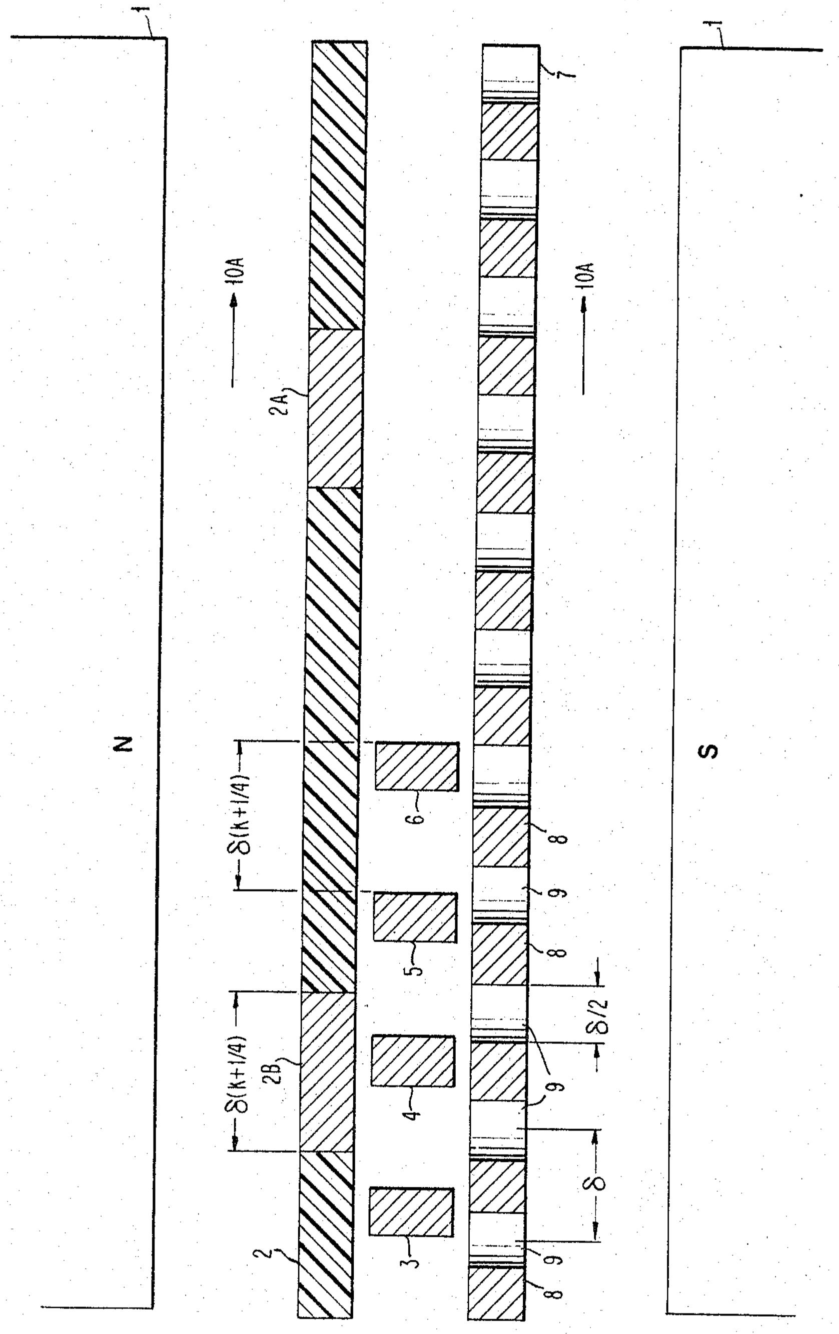
FIG. 1 illustrates a gear in a developed view in the plane of the drawing.
Figure 2:
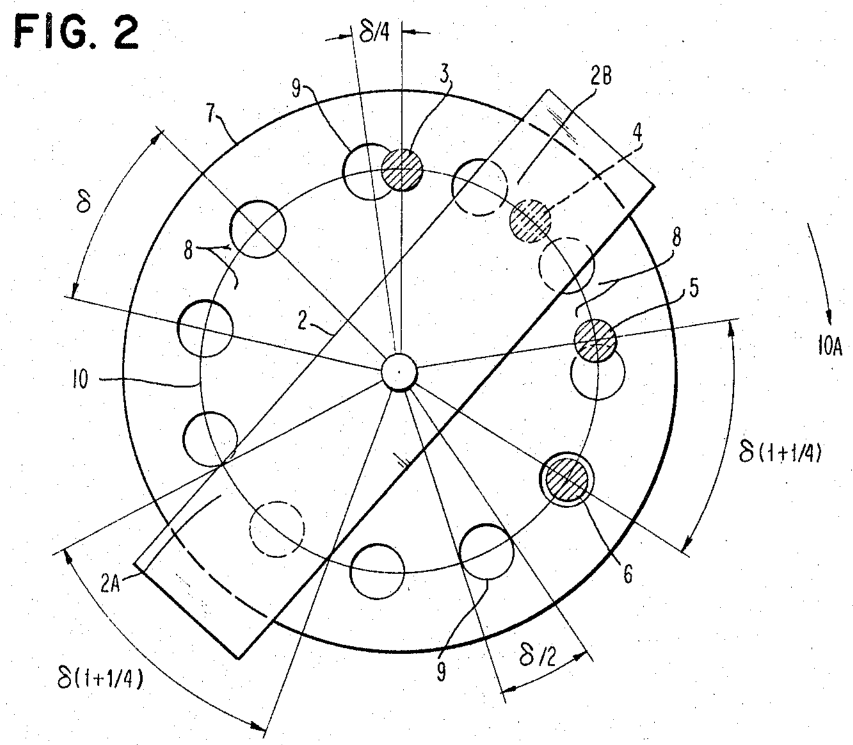
FIGS. 2, 3, 4 and 5 are top plan views of the gear with different operating positions.

In FIG. 1 the gear, illustrated in the plane of the drawing in a developed view taken along the pitch circle 10 of FIG. 2 of the drawing, is arranged between a north pole and a south pole of a permanent magnet 1. The magnetic gear consists of a driver 2, referred to as "driving part" in the following description. This consists of two different materials, a soft magnetic material of high permeability, shown hatched and designated by 2A and 2B, and the remaining material being a non-magnetizable material. At a short distance from the driving part 2 are four coupling elements 3, 4, 5 and 6. These are at a certain distance from one another and consist of soft magnetic material. They are held in fixed positions in relation to the permanent magnet 1 by non-magnetizable components. These holding parts of coupling elements 3 through 6, for the sake of clarity, are not shown in FIG. 1. At a short distance from the coupling elements is a driven part 7 which has magnetic areas 8 alternating with non-magnetizabel areas 9. Arrows 10A indicate the direction of rotation of driving part 2 and driven part 7.

The driving part 2, consisting of regions 2A and 2B, can be designed as a bar as shown in subsequent figures. The width of the bar depends upon the distance of coupling elements 3, 4, 5 and 6 from one another. These may, e.g., be of cylindrical shape, as is shown in subsequent figures. Driven part 7 can be produced as follows. Bore holes 9 are placed in a plate of soft magnetic material. Their diameter is larger than that of coupling elements 3 through 6. In the present embodiment eleven bore holes 9 have been placed in driven part 7. With eleven bore holes in the driven part 7 and two regions 2A and 2B in the driving part 2, the gear shown has a gear ratio of 11:3. This is elucidated with the aid of the following figures.

The dimensions given in FIG. 1 are explained in more detail in the following description. It should be noted that those dimensions are given as circular measures.

$T_s$=number of holes 9 in driven part 7

$B_s=\delta=2\pi/T_s$=distance from hole center 9 to hole center 9 in the driven part 7

Diameter of the hole 9 is $\delta/2$

The diameter of coupling elements 3, 4, 5 and 6 is smaller than the diameter of a hole 9.

$T_p$=number of bars of the driving part
$B_p=\gamma=2\pi/T_p$=distance from bar center to bar center
$B_k=\beta=B_p/p$=distance from coupling element center point to coupling element center point $p$=number of coupling elements
$k$=whole number The gear ratio thus becomes $$U=\frac{T_s}{T_s-T_p\cdot p\cdot k}$$

In FIGS. 1 through 5, $p=4$. In the changeable gear according to FIG. 7, $p=4$ in the outer and $p=3$ in the inner pitch circle.

The bar width of the driving part 2 is approximately equal to $\beta$. The exact bar width depends upon:

(a) the cross section shape of the coupling elements
(b) the contour of the bar in the region of the coupling elements
(c) the desired gear characteristic, determined by the function magnetic flux versus angle of rotation of bar 2.

As has been mentioned, the embodiment of FIG. 1 has a gear ratio of 11:3, i.e., with a revolution of 360° of driving part 2, driven part 7 revolves by $3/11$ of a revolution, or 98°. If there were 5 rather than 4 coupling elements, the gear ratio would be 11:1.

With a different number of holes 9 in driven part 7, the gear ratio will also change. This will be elucidated in a description of the following figures.

Figure 3:
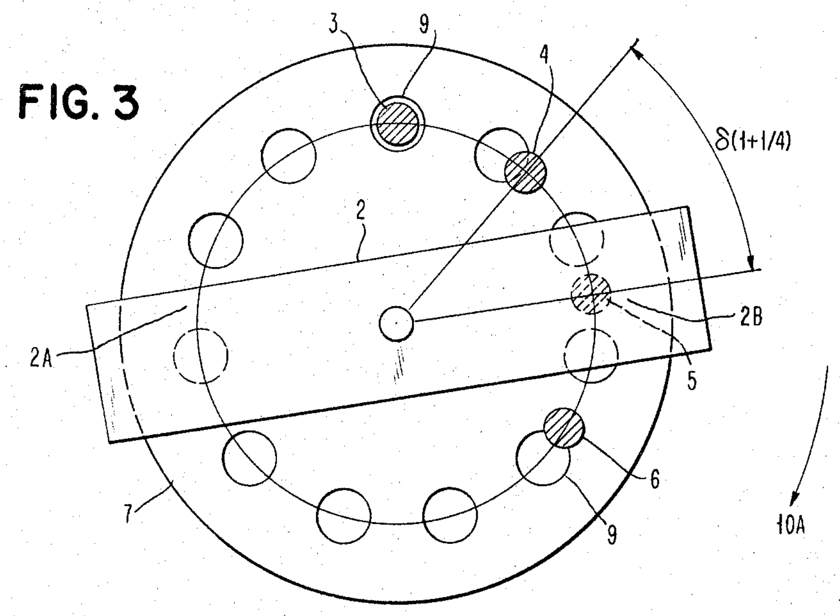

FIG. 2 shows a top plan view of the gear. Driving part 2 includes the bar 2 of soft magnetic material whose ends are designated by 2A and 2B. Below this bar a non-magnetic holding device (not shown) is provided for the magnetic coupling elements 3, 4, 5 and 6. Coupling elements 3 through 6 are of cylindrical shape. The coupling elements are at a distance $\gamma/p$ from one another. Below the plane in which the coupling elements 3 through 6 are arranged is the driven part 7 with its holes 9 at a distance $\delta$ from one another. Holes 9 and coupling elements 3 through 6 are arranged on the same pitch circle 10. The gear parts shown in FIG. 2 are housed with a casing containing the permanent magnet 1, arranged in the same manner as shown in FIG. 1. For the sake of clarity, neither the permanent magnet 1 nor the casing is shown in FIGS. 2, 3, 4, 5 and 7. FIG. 2 shows a certain position of the driven part 7 in relation to the coupling elements 3–6 and to the driving part 2. Bar section 2B of driving part 2 is positioned above coupling element 4. The latter, under the influence of the magnetic flux, has assumed a position between two holes 9. The magnetic flux passing from the north pole of the permanent magnet (not shown) across the bar section 2B and, via coupling element 4, to magnetic area 8 of the driven part 7 and then to the other pole of the parmanent magnet, causes magnetc coupling between driving part 2, driven part 7, and one coupling element 4. If the bar 2 is turned further in the direction of the arrow 10A, the magnetic flux passes from coupling element 4 to coupling element 5. The step by which it advances is $\gamma/p=2\pi/p\cdot T_p$. In the example shown, $T_p=2$, $T_s=11$ and $p=4$. The step of the driving part 2 is thus 45°. The driven part 7 is now no longer in stable equilibrium. To assume its new balance, it must revolve by $\gamma/p-\delta=2\pi\cdot 3/88$ in the same direction as the driving part 2. The new position of the gear parts is shown in FIG. 3.

Figure 4:
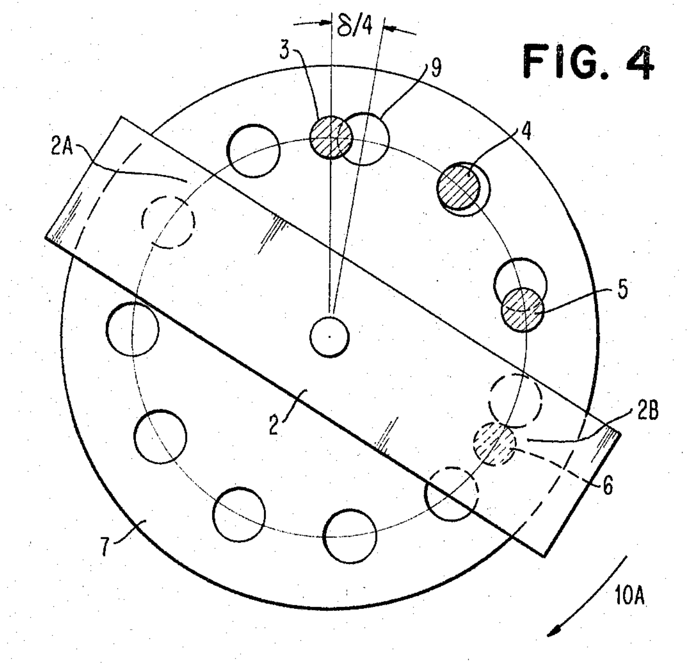

FIG. 4 shows the position of the individual gear parts in relation to each other when bar part 2B has once more turned by a 45° step in the direction of the arrow 10A. Bar part 2B is now above coupling element 6. While bar part 2B revolved, the magnetic flux moved from coupling element 5 to coupling element 6, and driven part 7 was thus further advanced by $\gamma/p-\delta$. This can be seen in FIG. 4.

Figure 5:
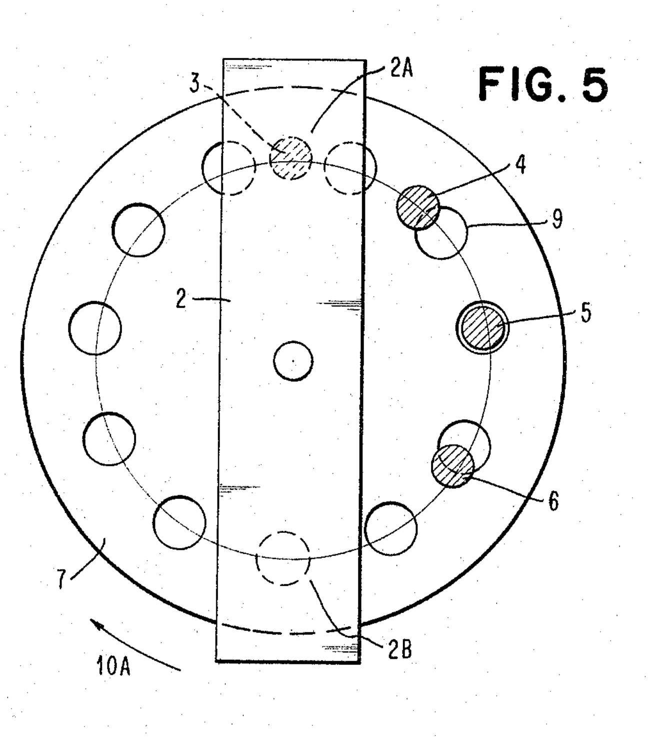

FIG. 5 shows a further 45° step of bar part 2B in the direction of the arrow. It should be noted that no coupling element lies below bar part 2B. The magnetic coupling between driving part 2, coupling elements 3 through 6, and driven part 7 now is accomplished by bar part 2A, which is above coupling element 3, as FIG. 5 shows. Again, this displacement of magnetic flux results in driven part 7 advancing by $\gamma/p-\delta$.

If bar part 2A now revolves by a further step in the direction of the arrow 10A, the resulting position of the bar is effectively the same as that shown in FIG. 2. In other words, the bar 2 has revolved by $\pi$ radians and the driven part 7 has revolved by $4(\gamma/p-\delta)=\pi\cdot 3/11$ radians; that is by 1½ hole pitches in the pitch circle, or, expressed differently, by $3/22$ of the total revolution. If the bar 2 now revolves by a further 180° in accordance with FIGS. 2 through 5, then, the bar 2, i.e., the driving part 2, having revolved by 360°, driven part 7 will have revolved by $360\times 3/11$ degrees.

Figure 6:
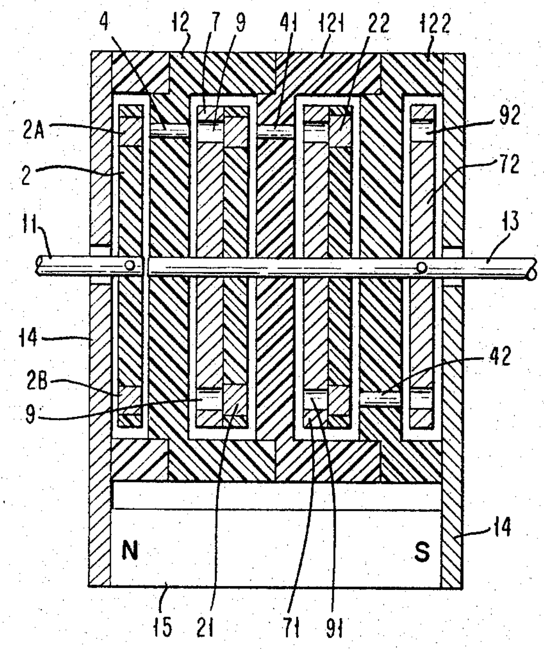
FIG. 6 is a section through a gear consisting of several stages.

FIG. 6 shows three one-stage gears arranged in sequence and constructed as one unit. The first one-stage gear includes the driving part 2 connected to a drive shaft 11, the coupling elements (only one coupling element 4 being shown) fixed in position by a holding ring 12 and, at a certain distance from the coupling element 4, the driven part 7 having holes 9. The second one-stage gear attaches to the first one-stage gear. It includes a driving part 21 with coupling elements 41 disposed in holding ring 121 and driven part 71 having holes 91. A third one-stage gear, having driving part 22, coupling elements 42 in holding ring 122 and driven part 72 with holes 92, attaches to the second one-stage gear. The individual gears idle on an output shaft 13 with the exception of the driven part 72 which is rigidly connected thereto. It should be noted that driven parts 7 and 71 are rigidly connected to the driving parts 21 and 22, respectively, and that these parts can idle on the output shaft 13.

The entire device is housed in a casing 14 containing a permanent magnet 15. The method of operation of the arrangement shown in FIG. 6 is as follows. When shaft 11, which is rotated by any suitable force (not shown), turns part 2 by one revolution, driven part 7 revolves by a smaller amount. The gear ratio depends on the relation between the number of holes 9 in the driven part 7 to the number of bar parts 2A, 2B of driving part 2. Let us assume that, as in the embodiments previously described, driving part 2 has two bar parts 2A and 2B and driven part 7 has eleven holes 9. A gear ratio of 3:11 thus obtains for the first stage. In the second stage, consisting of driving part 21, coupling elements 41 in holding device 121 and driven part 71 with holes 91, the same or a different gear ratio can be obtained. In the third stage, which is attached to the second stage, the same or a different gear ratio can again be chosen. With these numerous possible combinations every conceivable gear ratio can be obtained from shaft 13 with respect to the rotation of shaft 11.

Figure 7A:
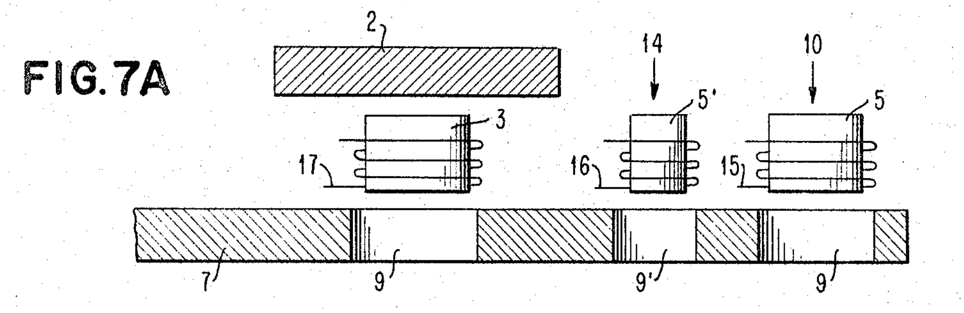
FIG. 7A is a section along line 7A—7A of FIG. 7.
Figure 7:
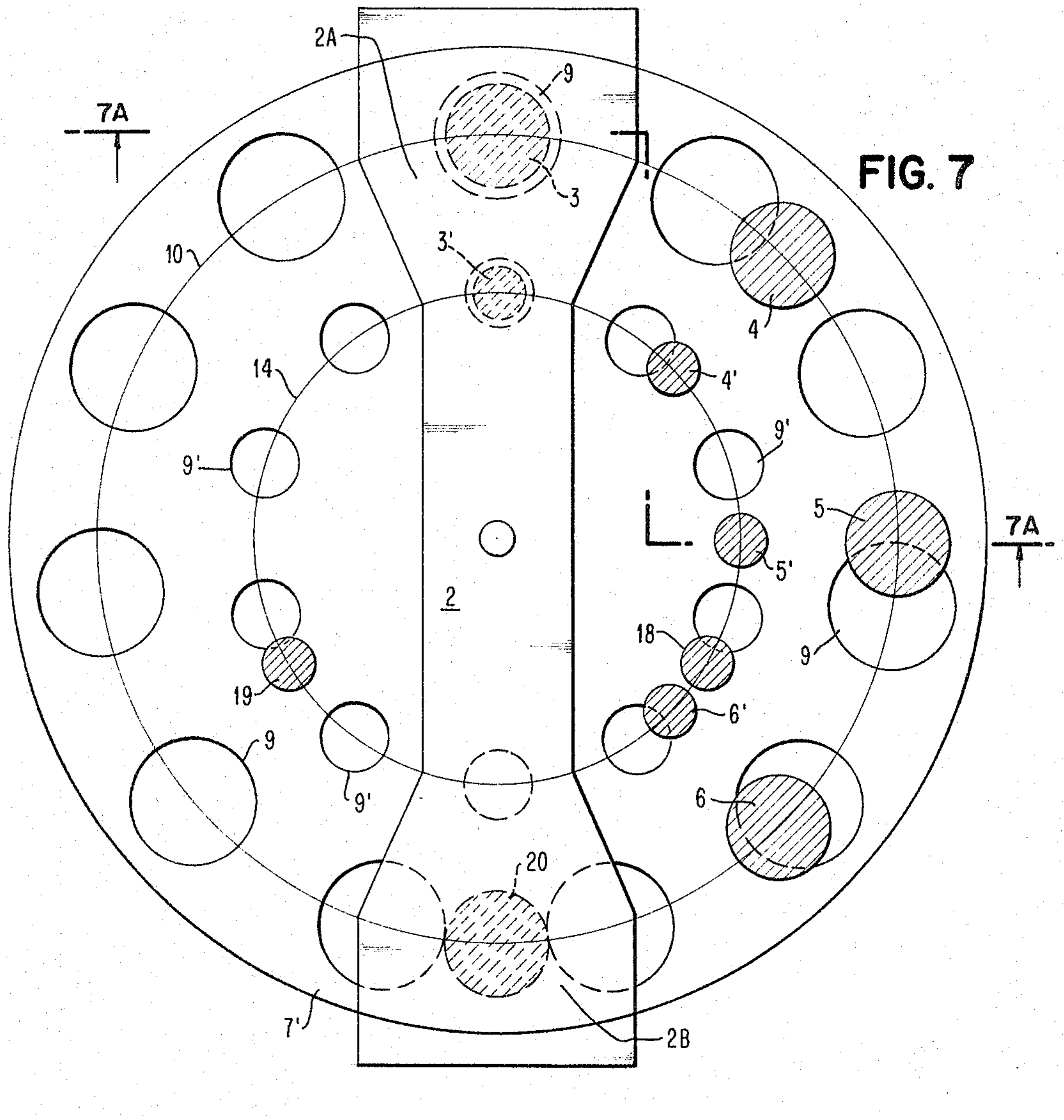
FIG. 7 is a top plan view of a gear with electrically changeable gear ratio and a section along line 7A—7A.

FIG. 7, similarly as in FIGS. 2 through 5, shows a top plan view of another embodiment of a magnetic gear of the present invention. A difference between the embodiments is in the fact that a different number of holes and coupling elements are provided on two pitch circles 10 and 14. On pitch circle 10, eleven holes 9 in a magnetic disk 7′ and four coupling elements 3, 4, 5 and 6 are arranged. On pitch circle 14, ten holes 9′ and four coupling elements 3′, 4′, 5′ and 6′ are arranged. The bar of driving part 2, with its halves 2A and 2B having magnetic material aligned with at least both sets of coupling elements, passes over both rows of holes, and, of course, also over both rows of coupling elements. A special feature of this arrangement is that in the gear shown in FIG. 7 no permanent magnet is used, instead, a casing of soft magnetic material (not shown) and coupling elements 3 through 6 are provided with coils, electromagnets being formed in this manner. This is indicated in FIG. 7A in a cross-sectional view taken through line 7A—7A in FIG. 7 in which coupling elements 3, 5' and 5 are shown provided with coils 17, 16 and 15, respectively. With this gear arrangement, four different gear ratios, i.e., 11:3, 11:1, 10:2 and 10:1, are possible. Of course, other gear ratios than those illustrated in FIG. 7 can be obtained.

As a further feature of the gear shown in FIG. 7, it should be mentioned that the part of the bar which passes over inner pitch circle 14 is narrower than the outer ends of 2A and 2B. This is associated with the fact that coupling elements 3' through 6' on the inner pitch circle 14 are closer together than those on the outer pitch circle 10.

FIG. 7 also shows that additional coupling elements 18 and 19 are provided on the inner pitch circle 14. In the same way, an additional coupling element 20 is provided on outer pitch circle 10.

The gear ratio can be changed by switching from outer pitch circle 10 to inner pitch circle 14. This is done by switching off coupling elements 3, 4, 5 and 6 of pitch circle 10, and switching on those of inner pitch circle 14 by energizing appropriate coils, such as shown at 15, 16 and 17. Another method of changing the gear ratio is to change the shape of the bar and the distribution of the coupling elements on the pitch circle. This will be elucidated with the aid of examples in the following description.

If the outer pitch circle 10 with its coupling elements 3, 4, 5 and 6 is to be used, the gear ratio is 11:3, in accordance with the formula $$U=\frac{T_s}{T_s-T_p\cdot p\cdot k}=\frac{11}{11-2\cdot 4\cdot 1}=\frac{11}{3}$$

If coupling elements 3, 4, 5 and 6 of outer pitch circle 10 are now switched off and coupling elements 3', 4', 5' and 6' of the inner pitch circle 14 switched on, the resulting gear ratio, according to the above formula, is $$U=\frac{T_s}{T_s-T_p\cdot p\cdot k}=\frac{10}{10-2\cdot 4\cdot 1}=\frac{10}{2}$$

If again a gear ratio change is desired, coupling elements 3', 4', 5' and 6' of the inner pitch circle 14 may be switched off and the coupling elements of outer pitch circle 10 again switched on. It must be considered, however, that the additional coupling element 20 is also energizable. According to the above formula, the gear ratio will now be $$U=\frac{T_s}{T_s-T_p\cdot p\cdot k}=\frac{11}{11-2\cdot 5\cdot 1}=\frac{11}{1}$$

If yet another gear ratio is to be obtained, e.g., in that part 2B of the bar does not pass over pitch circle 14, so that only one part, 2A, of the bar passes over the pitch circle 14, the outer pitch circle 10 is switched off and coupling elements 3', 18, 19 on the inner pitch circle 14 are switched on. According to the above formula, the gear ratio becomes $$U=\frac{T_s}{T_s-T_p\cdot p\cdot k}=\frac{10}{10-1\cdot 3\cdot 3}=\frac{10}{1}$$

In the first three examples, $k=1$. In the last example, for reasons of symmetry, $k$ was chosen as being equal to 3.

Examples of changing the gear ratio were enumerated merely to illustrate some of the many possible combinations which exist in the inventive gear.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A magnetic gear comprising:
(a) first, second and third magnetic elements,
(b) means for producing a magnetic field passing serially through said elements,
(c) said first element being movable with respect to said second and third elements transversely to the direction of said field and
(d) said second element being fixed with respect to said magnetic field producing means, and
(e) means for driving said third element in a direction transverse to the direction of said magnetic field, whereby a change in position of said third element with respect to said second element transmits force to said first element.

2. A magnetic gear as set forth in claim 1 wherein said magnetic field producing means includes a permanent magnet.

3. A magnetic gear as set forth in claim 1 wherein said magnetic field producing means includes a coil surrounding one of said magnetic elements.

4. A magnetic gear as set forth in claim 1 wherein
(a) said driving means includes means for rotating said third element about a given axis and further including
(b) means rotatable about said given axis for carrying said first element.

5. A magnetic gear comprising:
(a) means having a plurality of magnetic sections disposed at predetermined spaced apart locations on a pitch circle in a first plane rotatable about a given axis,
(b) a plurality of coupling elements each made of magnetic material and disposed at predetermined locations on said pitch circle in a second plane parallel to said first plane,
(c) means including a magnetic driving element disposed on said pitch circle for rotating said driving element about said given axis in a third plane parallel to said first plane, and
(d) means fixed with respect to said coupling elements for producing a magnetic field passing serially through said driving element, one of said coupling elements and one of said magnetic sections.

6. A magnetic gear as set forth in claim 5 wherein said coupling elements are interposed between said magnetic sections and said driving element.

7. A magnetic gear as set forth in claim 5 wherein said magnetic field producing means includes a casing made of magnetic material enclosing said magnetic sections, said coupling elements and said driving element.

8. A magnetic gear as set forth in claim 5 wherein said rotatable means includes a magnetic disk having apertures therein along said pitch circle.

9. A mganetic gear as set forth in claim 8 wherein said rotating means includes a bar having a magnetic driving element at each end thereof on said pitch circle.

10. A magnetic gear as set forth in claim 8 wherein each of said coupling elements has a cylindrical form.

11. A magnetic gear as set forth in claim 8 wherein equal spaces are provided between said apertures and the number of said magnetic sections is in a predetermined relationship to the number of said plurality of coupling elements along a given section of said pitch circle.

12. A magnetic gear as set forth in claim 11 wherein the number of magnetic sections and the number of said coupling elements are in predetermined relationship per driving element, whereby the gear ratio is equal to $$\frac{T_s}{T_s-(T_p\cdot p\cdot k)}$$

where $T_s$ is the number of said apertures, $T_p$ is the number of said drive elements, $p$ is the number of said coupling elements and $k$ is a whole number.

13. A magnetic gear as set forth in claim 5 further including (a) a plurality of second coupling elements each made of magnetic material and disposed at predetermined locations on a second pitch circle in said second plane and wherein (b) said rotatable means further has a plurality of second magnetic sections disposed at predetermined spaced apart locations on said second pitch circle in said first plane, (c) said rotating means further includes a second magnetic driving element disposed on said second pitch circle in said third plane, and (d) said magneitc field producing means includes a plurality of coils surrounding said coupling elements.

14. A magnetic gear system comprising:

(A) a first magnetic gear including (a) first means having a plurality of magnetic sections disposed at predetermined spaced apart locations on a pitch circle on a first plane rotatable about a given axis, (b) a plurality of first coupling elements each made of magnetic material and disposed at predetermined locations on said pitch circle in a second plane parallel to said first plane, (c) first means including a first magnetic driving element disposed on said pitch circle for rotating said driving element about said given axis in a third plane parallel to said first plane and (d) means fixed with respect to said coupling element for producing a magnetic field passing serially through said driving element, one of said coupling elements and one of said magnetic sections, and (B) a second magnetic gear including (e) second means having a plurality of second magnetic sections disposed at predetermined spaced apart locations on a given pitch circle in a fourth plane parallel to said first plane rotatable about said given axis, (f) a plurality of second coupling elements each made of magnetic material and disposed at predetermined locations on said given pitch circle in a fifth plane parallel to said first plane, and (g) second means including a second magnetic driving element disposed on said given pitch circle for rotating said second driving element about said given axis in a sixth plane parallel to said first plane, and (h) said second driving element, one of said second coupling elements and one of said second magnetic sections being disposed to pass said magnetic field serially therethrough, said first coupling elements being interposed between said first magnetic sections and said first driving element, said second coupling elements being interposed between said second magnetic sections and said second driving elements and (C) said first rotatable means being mechanically coupled to said second rotating means.

References Cited

UNITED STATES PATENTS 3,301,091 1/1967 Reese ------------ 310—103 X

ROBERT K. SCHAEFER, *Primary Examiner.*

H. O. JONES, *Assistant Examiner.*